United States Patent
Cavaliere et al.

(10) Patent No.: US 10,187,159 B2
(45) Date of Patent: Jan. 22, 2019

(54) OPTICAL SOURCE

(71) Applicant: Telefonaktiebolaget LM Ericsson (publ), Stockholm (SE)

(72) Inventors: Fabio Cavaliere, Pisa (IT); Antonio D'Errico, Pisa (IT); Luca Giorgi, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/324,323

(22) PCT Filed: Jul. 7, 2014

(86) PCT No.: PCT/EP2014/064488
§ 371 (c)(1),
(2) Date: Jan. 6, 2017

(87) PCT Pub. No.: WO2016/004975
PCT Pub. Date: Jan. 14, 2016

(65) Prior Publication Data
US 2017/0163348 A1    Jun. 8, 2017

(51) Int. Cl.
*H04B 10/556* (2013.01)
*G02F 1/01* (2006.01)
*H04B 10/50* (2013.01)

(52) U.S. Cl.
CPC ........ *H04B 10/556* (2013.01); *G02F 1/011* (2013.01); *H04B 10/503* (2013.01);
(Continued)

(58) Field of Classification Search
CPC .... H04B 10/5053; H04B 10/532; H04J 14/06
See application file for complete search history.

(56) References Cited

U.S. PATENT DOCUMENTS

| 7,515,276 B2 | 4/2009 | Froggatt et al. |
| 2007/0065161 A1* | 3/2007 | Miura .................. G02F 1/0123 398/186 |

(Continued)

FOREIGN PATENT DOCUMENTS

| EP | 2154799 A1 | 2/2010 |
| JP | 2002214456 A | 7/2002 |

(Continued)

OTHER PUBLICATIONS

Narasimha, Adithyaram et al., "An Ultra Low Power CMOS Photonics Technology Platform for H/S Optoelectronic Transceivers at less than $1 per Gbps", OSA/OFC/NFOEC 2010 IEEE OMV4.pdf, 2010, 1-3.

(Continued)

*Primary Examiner* — Mina Shalaby
(74) *Attorney, Agent, or Firm* — Murphy, Bilak & Homiller, PLLC

(57) ABSTRACT

The present invention provides an optical source comprising a laser, a first optical power splitter, phase changing equipment, polarisation state setting equipment, a polarisation beam coupler and an output. The laser is configured to generate an optical signal. The first optical power splitter is configured to split the optical signal into a first optical signal and a second optical signal. The phase changing equipment is configured to change the phase of at least one of the first optical signal and the second optical signal such that the first optical signal has a first phase and the second optical signal has a second phase different from the first phase by a preselected phase difference. The polarisation state setting equipment is configured to set the polarisation state of at least one of the first optical signal and the second optical signal such that the first optical signal has a first state of polarisation and the second optical signal has a second state of polarisation substantially orthogonal from the first state of (Continued)

polarisation. The polarisation beam coupler is configured to combine the first optical signal and the second optical signal into a composite optical signal comprising both the first optical signal and the second optical signal having said orthogonal states of polarisation. The output is arranged to output at least a portion of the composite optical signal.

15 Claims, 4 Drawing Sheets

(52) U.S. Cl.
CPC ...... *G02F 2201/58* (2013.01); *G02F 2203/06* (2013.01); *G02F 2203/50* (2013.01)

(56) References Cited

U.S. PATENT DOCUMENTS

| 2011/0170869 A1* | 7/2011 | Mandai | H04J 14/06 398/65 |
| 2012/0087617 A1* | 4/2012 | Morishita | G02F 1/0121 385/3 |
| 2012/0275791 A1* | 11/2012 | Zeng | H04B 10/5053 398/65 |
| 2013/0094797 A1 | 4/2013 | Zheng et al. | |
| 2017/0142667 A1* | 5/2017 | Takeda | H04W 52/365 |

FOREIGN PATENT DOCUMENTS

| WO | 2010088587 A1 | 8/2010 |
| WO | 2015144224 A1 | 10/2015 |

OTHER PUBLICATIONS

Curti, Franco et al., "Statistical Treatment of the Evolution of the Principal States of Polarization in Single-Mode Fibers", IEEE Journal of Lightwave Technology, vol. 8, No. 8, Aug. 1990, 1162-1166.

Gordon, J.P. et al., "PMD fundamentals: Polarization mode dispersion in optical fibers", PNAS, vol. 97, No. 9, Apr. 25, 2000, 4541-4550.

Laere, Frederik V. et al., "Focusing Polarization Diversity Grating Couplers in Silicon-on-Insulator", Journal of Lightwave Technology, vol. 27, No. 5, Mar. 1, 2009, 612-618.

Li, Yupeng et al., "Any Bias Point Control Technique for Mach—Zehnder Modulator", IEEE Photonics Technology Letters, vol. 25, No. 24, Dec. 15, 2013, 2412-2415.

* cited by examiner

OPTICAL SOURCE

TECHNICAL FIELD

The present invention relates to an optical source, an optical communications network transmitter and an optical communications network node which may, for example, be a communications network base station node. The present invention also relates to a method of providing an optical signal.

BACKGROUND

When a continuous wave, CW, optical signal has to be delivered to a single polarization device, SPD, for example an optical modulator, normally either a polarization maintaining fibre, PMF, pigtail is provided on both the device and the laser source to be connected or the laser source is directly integrated in the optical device itself, so that the state of polarisation of the optical signal is fully defined and can easily be aligned with the required polarization direction of the optical device. Connection using PMF has been widely adopted in many applications where the distance between the laser source and the optical device is short, typically up to few meters, because the laser source and the optical device are located in the same hardware module or in the same equipment. The laser integration option has been adopted in a new low cost, silicon photonics parallel optic transceiver reported by A. Narasimha et al, "An Ultra Low Power CMOS Photonics Technology Platform for H/S Optoelectronic Transceivers at less than $1 per Gbps", Proc. OFC 2010, paper OMV4.

In communications network base station optical interconnections between a radio equipment controller, REC, (which may also be referred to as a baseband unit) and a radio equipment, RE, (which may also be referred to as a remote radio unit) the length of the optical link can reach up to 10 Km. In such applications it may be convenient to place the laser source for the RE optical modulator in the REC cabinet, where the operating temperature range is controlled by a cooling system, and to supply the optical signal to the optical modulator remotely. If the laser source is coupled to the RE optical modulator using single mode fibre, SMF, a few km long, the state of polarization, SOP, of the optical signal will randomly fluctuate in time due to temperature and external force-induced birefringence variations along the fibre. A polarizer may be provided in front of the RE optical modulator to select the correct polarization component but SOP fluctuations in the SMF can cause large intensity variations to occur at the polarizer output, preventing good performance of a single-polarization device such as the RE optical modulator. In this case the use of a long length (up to 10 Km) of PMF may be not acceptable due to the higher cost involved (around 30 times more than using SMF) and the higher attenuation of PMF as compared to SMF. The use of SMF is therefore preferred.

SUMMARY

Embodiments of the present invention aim to provide an improved optical source.

One solution to the above problem is to use a depolarised broadband light source as the remote optical source, such that a significant fraction of the emitted power is always present on the state of polarisation accepted by the optical device, even if the optical signal is transmitted over SMF. However, a problem with this solution is that, due to the wide bandwidth spectrum of broadband light, it is not possible to transmit the light over a long distance (e.g. up to 10 km) with good performance, due to chromatic dispersion and low emitted power.

Another solution, which is described in the Applicant's unpublished patent application PCT/EP2014/056151, is to use an optical source, which comprises a first laser, a second laser, a polarisation beam coupler and output. The first laser is arranged to generate a first optical signal having a first state of polarisation and a first optical frequency. The second laser is arranged to generate a second optical signal having a second state of polarisation and having a second optical frequency. The second state of polarisation is substantially orthogonal to the first state of polarisation, and the second optical frequency is different to the first optical frequency by a preselected frequency difference. The polarisation beam coupler is arranged to combine the first optical signal and the second optical signal into a composite optical signal comprising both the first optical signal and the second optical signal having said substantially orthogonal states of polarisation. The output is arranged to output the composite optical signal.

This solution has the advantage that the optical source may generate an optical signal which has an optical power associated with any arbitrary state of polarisation, SOP, which is maintained within a preselected range at the end of a feeder fibre, which may be SMF of up to 10 km.

However, in some embodiments a mechanism may be required to compensate for frequency drift of the lasers, and so monitor and control the difference between the frequencies of the optical signals generated by the lasers. For example, where the optical device which receives the composite optical signal output by the optical source is an optical modulator, which modulates the composite optical signal to carry information and transmits the modulated optical signal to a receiver, the frequency difference between the two light signals should be more than twice the receiver's electrical bandwidth but typically less than a few tens of GHz to mitigate for chromatic and polarisation mode dispersion.

The present invention provides an alternative solution.

According to the present invention, there is provided an optical source comprising a laser, a first optical power splitter, phase changing equipment, polarisation state setting equipment, a polarisation beam coupler and an output. The laser is configured to generate an optical signal. The first optical power splitter is configured to split the optical signal into a first optical signal and a second optical signal. The phase changing equipment is configured to change the phase of at least one of the first optical signal and the second optical signal such that the first optical signal has a first phase and the second optical signal has a second phase different from the first phase by a preselected phase difference. The polarisation state setting equipment is configured to set the polarisation state of at least one of the first optical signal and the second optical signal such that the first optical signal has a first state of polarisation and the second optical signal has a second state of polarisation substantially orthogonal from the first state of polarisation. The polarisation beam coupler is configured to combine the first optical signal and the second optical signal into a composite optical signal comprising both the first optical signal and the second optical signal having said orthogonal states of polarisation. The output is arranged to output at least a portion of the composite optical signal.

Embodiments of the present invention have the advantage that the optical source may generate an optical signal which has an optical power associated with any arbitrary state of polarisation, SOP, that is maintained within a preselected range at the end of a feeder fibre. This may enable the optical signal to be transmitted across up to tens of km of SMF while maintaining the optical power associated with a preselected SOP within a preselected range, which may allow good performance of a single-polarisation photonic integrated device provided at the end of the feeder fibre. Furthermore, embodiments of the present invention have the advantage that the optical source may provide an optical signal which has relatively low phase noise. Thus, the optical source may be desirable for use in a variety of applications, for example for use in a high speed optical communications network transmitter (e.g. at 100 Gbit and beyond).

In a preferred embodiment of the present invention, the phase changing equipment may comprise a first optical path arranged such that the first optical signal travels from the optical power splitter to the polarisation beam coupler via the first optical path and a second optical path arranged such that the second optical signal travels from the optical power splitter to the polarisation beam coupler via the second optical path. The first optical path has a different refractive index from the second optical path.

In a further preferred embodiment of the present invention, the phase changing equipment may further comprise one or more control elements, and a control unit configured to provide one or more control signals to cause the one or more control elements to adjust the refractive index of the first optical path and or the refractive index of the second optical path. Thus, advantageously, the phase of the first optical signal and or the phase of the second optical signal, in the composite optical signal, (i.e. the phase difference) may be adjusted, for example to compensate for incoherence of the laser.

A laser has a predetermined coherence length, which means that interferometric crosstalk, which results in power fluctuations, may arise in the composite optical signal, given that in the above described embodiment two replica (the first optical signal and the second optical signal) of the same laser light are coupled after propagation along respective optical paths.

In an embodiment of the present invention, the optical source may further comprise a second optical power splitter arranged to split off a portion of the composite optical signal. The control unit may be configured to provide the one or more control signals based on said portion of the composite optical signal.

In a preferred embodiment of the present invention, the optical source may further comprise polarisation state rotating equipment, polarisation state selecting equipment, an optical to electrical signal convertor. The polarisation state rotating equipment is configured to rotate the states of polarisation of the portion of the composite optical signal by 45 degrees plus k times 90 degrees, where k is an integer number, to produce a further composite optical signal. The polarisation state selecting equipment is configured to select a portion of the further composite optical signal at the first polarisation state or at the second polarisation state. The optical to electrical signal convertor is configured to convert the portion of the further composite optical signal into an electrical signal. The control unit is configured to provide the one or more control signals based on the electrical signal.

As explained further below, advantageously, due to the configuration of the polarisation state rotating equipment and the polarisation state selecting equipment, this preferred embodiment enables the one or more control signals to be derived from the electrical signal, as the electrical signal will be a function of the phase difference between the first and second optical signals in the composite optical signal. Thus, the one or more control signals may act so as to maintain the phase difference between the first and second optical signals at a preselected phase difference, and thereby to compensate for the incoherence of the laser.

The preselected phase difference may be substantially 90 degrees plus k times 180 degrees, where k is an integer number.

The optical source may further comprise a feeder optical fibre coupled at one end to the output, which may for example be an SMF optical fibre.

There is further provided an optical communications network transmitter comprising an optical source as described above.

The optical communications network transmitter may further comprise an optical modulator configured to receive at least a portion of the composite optical signal output by the optical source and to modify the at least a portion of the composite optical signal to carry information to be transmitted by the optical communications network transmitter.

There is further provided a first communications network node comprising an optical source as described above, the first communications network node being configured to transmit at least a portion of the composite optical signal output by the optical source to a second communications network node comprising an optical device arranged to receive at least a portion of said portion of the composite optical signal.

The first communications network node may be a first communications network base station node (for example a REC). The second communications network node may be a second communications network base station node (for example an RE).

There is further provided a method of providing an optical signal, comprising producing a composite optical signal using an optical source as described above, and transmitting the composite optical signal, over an optical link, to a remote optical device.

BRIEF DESCRIPTION OF THE DRAWINGS

Embodiments of the present invention will now be described, by way of example only, with reference to the accompanying drawings in which.

DESCRIPTION

Figure 1:
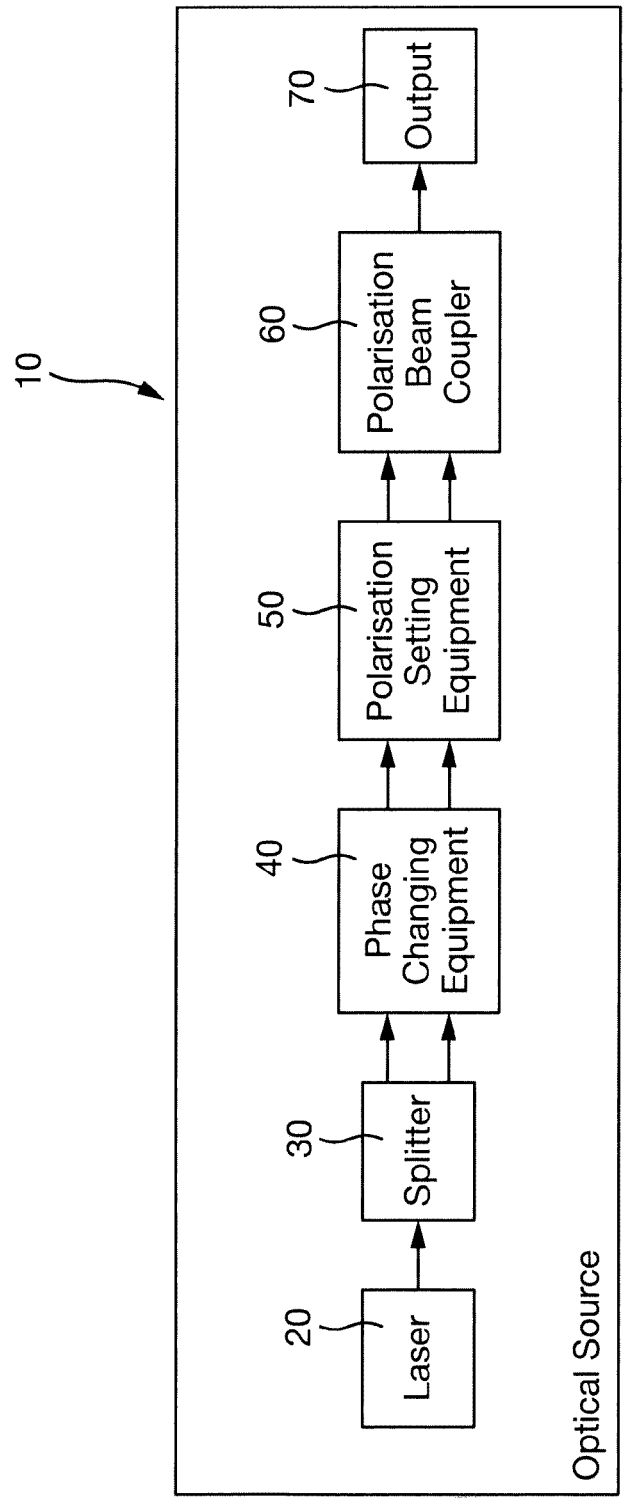
FIG. 1 shows an optical source according to an embodiment of the present invention.

FIG. 1 shows an optical source 10 according to an embodiment of the present invention. The optical source 10 comprises a laser 20, a first optical power splitter 30, phase changing equipment 40, polarisation state setting equipment 50, a polarisation beam coupler 60 and an output 70. The laser 20 is configured to generate an optical signal. The first optical power splitter 30 is configured to split the optical signal into a first optical signal and a second optical signal. The phase changing equipment 40 is configured to change the phase of at least one of the first optical signal and the second optical signal such that the first optical signal has a first phase and the second optical signal has a second phase different from the first phase by a preselected phase difference. The polarisation state setting equipment 50 is configured to set the polarisation state of at least one of the first optical signal and the second optical signal such that the first optical signal has a first state of polarisation and the second optical signal has a second state of polarisation substantially orthogonal from the first state of polarisation. The polarisation beam coupler 60 is configured to combine the first optical signal and the second optical signal into a composite optical signal comprising both the first optical signal and the second optical signal having said orthogonal states of polarisation. The output 70 is arranged to output at least a portion of the composite optical signal.

Figure 2:
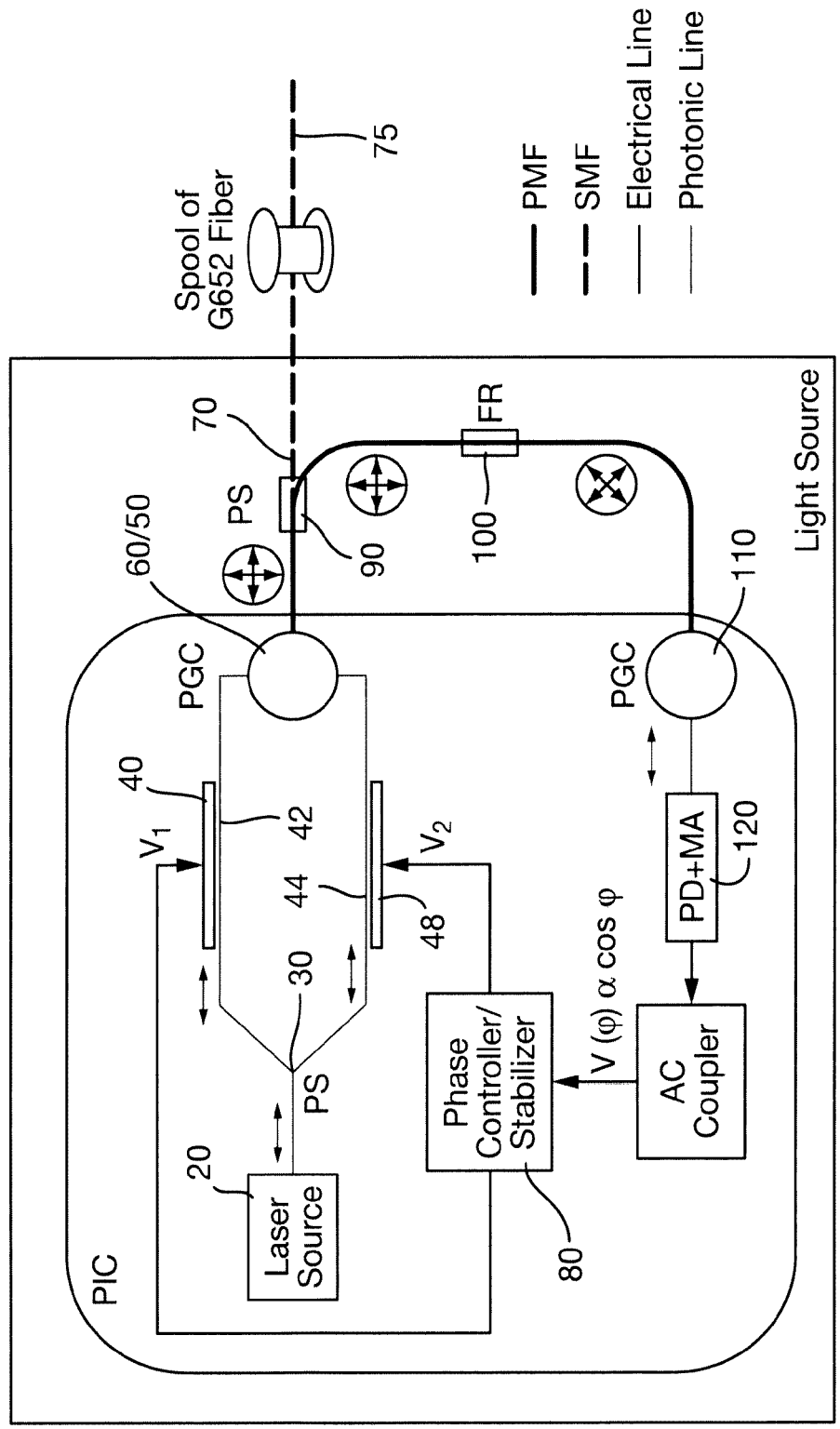
FIG. 2 shows an optical source according to a preferred embodiment of the present invention.

FIG. 2 shows an optical source 10 according to a preferred embodiment of the present invention. In this example, the laser 20, which may for example be a distributed feedback DFB laser, is configured to generate an optical signal having a state of polarisation, in this example a TE polarisation state, a phase, and a wavelength which in this example is around 1550 nm. The laser 20 has a predefined coherence length. The laser 20 is coupled to the first optical power splitter 30, for example by an optical path, such as a silicon waveguide. The first optical power splitter 30 has an input arranged to receive the optical signal, a first output arranged to output the first optical signal and a second output arranged to output the second optical signal. In this example, the first optical power splitter 30 is configured to split the optical signal such that the first optical signal and the second optical signal have the same power (half the power of the optical signal). The first optical signal and the second optical signal each have the same wavelength as the optical signal generated by the laser 20. Further, in this example, the first optical signal and the second optical signal, when output from the first optical power splitter 30, have the same state of polarisation as the optical signal generated by the laser 20 (thus, in this example a TE polarisation state), as indicated in FIG. 2.

In this preferred embodiment of the present invention, the phase changing equipment 40 comprises a first optical path 42 arranged such that the first optical signal travels from the optical power splitter 30 to the polarisation beam coupler 60 via the first optical path 42, and a second optical path 44 arranged such that the second optical signal travels from the optical power splitter to the polarisation beam coupler via the second optical path. The first optical path has a different refractive index from the second optical path, whereby the first optical signal and the second optical signal, which arrive at the polarisation beam coupler 60, will have respective phases (the first phase and the second phase).

In this example, the first optical path 42 is arranged to couple the optical power splitter 30 to the polarisation beam coupler 60, (i.e. the first optical path 42 connects the first output of the optical power splitter 30 to the polarisation beam coupler 60). Similarly, the second optical path 44 is arranged to couple the optical power splitter 30 to the polarisation beam coupler 60 (i.e. the second optical path 44 connects the second output of the optical power splitter 30 to the polarisation beam coupler 60). The first and second optical paths 42, 44 may for example be silicon waveguides of only a few hundred nanometers length, which in this example support only TE polarisation modes. Preferably, the first optical path 42 and the second optical path 44 have the same length.

In this preferred embodiment of the present invention, the polarisation beam coupler 60 and the polarisation state setting equipment 50 are comprised within an integral device, which in this example is a polarisation grating coupler (PGC). However, in alternative embodiments, these elements could be separate components. This PGC is a passive and reciprocal device. In this example, the PGC is configured to combine the two optical signals (having TE polarisation states) into a composite or single optical signal comprising both the first optical signal and the second optical signal having orthogonal states of polarisation, as indicated in FIG. 2. The PGC is coupled to the output 70 by a polarisation maintaining fibre, PMF, the two orthogonal polarisation states being aligned with the two principal SOPs of the PMF.

In this example, the output 70 is coupled to a feeder fibre 75 which is SMF. However, it should be appreciated that this feature is not required in all applications.

In this preferred embodiment of the present invention, the phase changing equipment 40 further comprises one or more control elements 46, 48 and a control unit 80 configured to provide one or more control signals to cause the one or more control elements 46, 48 to adjust the refractive index of the first optical path 42 and or the refractive index of the second optical path 44. The control signals may comprise control voltages, $V_1$, $V_2$, In this example, there are two control signals applied to change the refractive index of the respective optical paths 42, 44. However, in other embodiments there may only be one control signal, which is arranged to change the refractive index of only one of the optical paths 42, 44.

In this preferred embodiment of the present invention, the optical source 10 further comprises a second optical power splitter 90. The second optical power splitter 90 is arranged to receive the composite optical signal output by the polarisation beam coupler 60 and has a first output and a second output. The first output, in this example, is output 70. The second optical power splitter 90 is arranged to split off a preferably small portion of the composite optical signal, and this portion is output from the second output. The control unit 80 is further configured to provide the one or more control signals based on said portion of the composite optical signal. Thus, advantageously, the incoherence of the laser 20 may be compensated for.

In this preferred embodiment of the present invention, the optical source 10 further comprises polarisation state rotating equipment 100 configured to rotate the states of polarisation of the portion of the composite optical signal by 45 degrees plus k times 90 degrees, where k is an integer number, to produce a further composite optical signal. k may be any integer number including zero. The optical source 10 further comprises polarisation state selecting equipment 110 configured to select a portion of the further composite optical signal at the first polarisation state or at the second polarisation state.

In this example, as shown in FIG. 2, the polarisation state rotating equipment 100 comprises a faraday rotator, which is coupled to the second output of the second optical power splitter 90 and to the polarisation state rotating equipment 100 by PMF. However, the polarisation state rotating equipment 100 could alternatively be realised in integrated photonics, by imposing for example a 45 degree shift between the PMF coupled from the second output of the second optical power splitter 90 and the polarisation state selecting equipment 100, which for example may be a PGC (polarisation grating coupler).

The optical device 10 further comprises an optical to electrical signal convertor 120 (for example a photo detector) configured to convert the portion of the further composite optical signal into an electrical signal. The control unit 80 is configured to provide the one or more control signals based on the electrical signal.

It can be demonstrated, as set out below, that the current of the detected electrical signal is:

$$I = \left|\frac{A}{2}\right|^2 [1 + \sin 2\theta \cos \varphi] \quad [1]$$

where θ is the number of degrees by which the polarisation state rotating equipment 100 rotates the states of polarisation of the portion of the composite optical signal (e.g. 45 degrees), and φ is the phase difference between the phase of the first optical signal and the phase of the second optical signal in the composite optical signal.

Proof of Equation 1

The electric field of the portion of the composite optical signal split off by the second optical power splitter 90, which in this example is launched into the PMF pigtail, is:

$$\vec{E} = \frac{A}{2} e^{j\omega_0 t} \vec{x} + \frac{A}{2} e^{j(\omega_0 t + \varphi)} \vec{y} \quad [2]$$

where x and y are the main states of polarisation of the composite optical signal, and the PMF, and $\omega_0/2\pi$ is the emission frequency of the laser.

The electric field of the further composite optical signal output from the polarisation state selecting equipment 110 is:

$$\vec{E} = \vec{E_{Pol}} = \frac{A}{2} e^{j\omega_0 t} [\cos\theta + e^{j\varphi} \sen\theta] \vec{k} \quad [3]$$

where k is the main SOP of the polarisation state selecting equipment 100 (e.g. the second PGC).

Equation 1 may be obtained by simply taking the square module of the right term in equation 3.

In this example, the electrical signal is amplified by an amplifier with gain Z, and AC coupled to the control unit 80.

Thus, the voltage of the resultant electrical signal is:

$$V(\varphi) = \left|\frac{A \cdot Z}{2}\right|^2 \cos\varphi$$

where this equation is obtained by setting θ to 45 degrees plus k times 90 degrees, where k is an integer number, which may be any integer number including zero.

Thus, it is seen that this voltage only depends on the phase difference φ (or phase offset) between the first and second optical signals in the composite optical signal. Thus, this signal may be used to generate appropriate control signals e.g. $V_1$ and $V_2$, so as to maintain the phase offset at the preselected value. For example, if the phase offset (i.e. the preselected phase difference) should be substantially 90 degrees plus k times 180 degrees (where k is an integer number which may include zero) V(φ) should be maintained at zero.

FIGS. 3 to 6 illustrate some example applications for the optical source 10 according to embodiments of the present invention. The optical source 10 may be used to provide an optical signal to any type of optical device, which may be polarisation sensitive, non-polarisation sensitive, passive or active.

Figure 3:
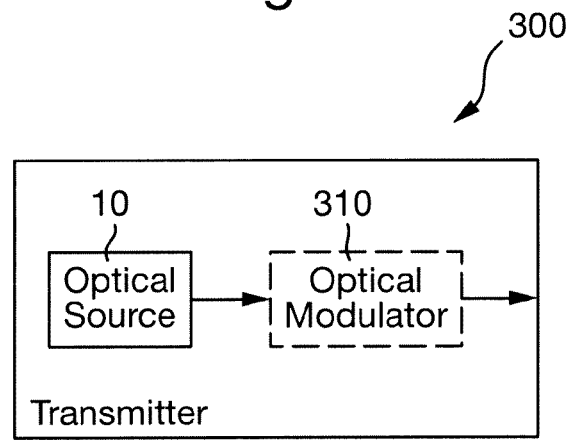
FIG. 3 shows an optical communications network transmitter including an optical source according to an embodiment of the present invention.
Figure 4:
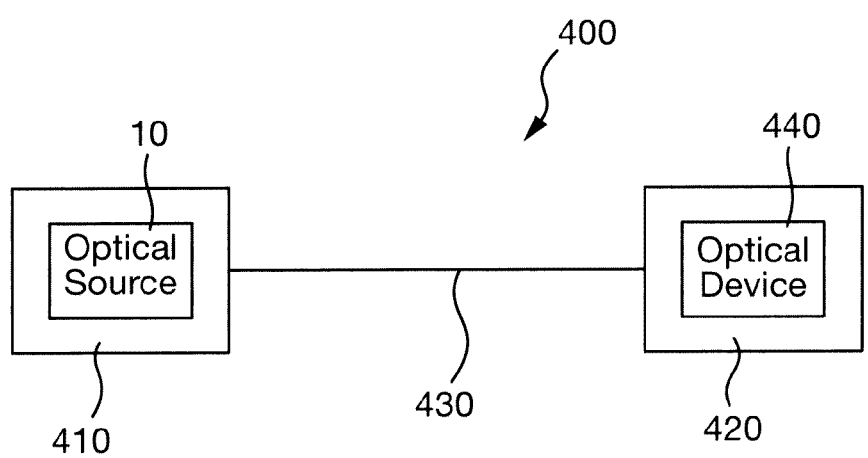
FIG. 4 shows an optical communications system including an optical source according to an embodiment of the present invention.

FIG. 3 shows an (integrated) optical communications network transmitter 300 comprising an optical source 10. In this example, the optical communications network transmitter 300 further comprises an optical modulator 310 configured to receive at least a portion of the composite optical signal output by the optical source 10 and to modify the at least a portion of the composite optical signal to carry information to be transmitted by the optical communications network transmitter 300. FIG. 4, on the other hand, shows a communications network system 400 comprising an optical source 10, where the optical source 10 is arranged to remote feed a remote optical device. The remote optical device may be a single polarisation device, arranged to operate at a preselected state of polarisation.

The system 400 comprises a first communications network node 410 which includes the optical source 10. This first network node 410 may be located in a temperature controlled environment, or include a temperature control element. The system 400 further comprises a second communications network node 420, which is coupled to the first communications network node 410 by an optical link 430. The second network node 420 may not be located in a temperature controlled environment or include a temperature control element. The first communications network node 410 is configured to transmit at least a portion of the composite optical signal output by the optical source 10 to the second communications network node, over the optical link 430. The second network node 420 comprises an optical device 440, which may for example be an optical modulator, which is arranged to receive at least a portion of said portion of the composite optical signal.

Figure 5:
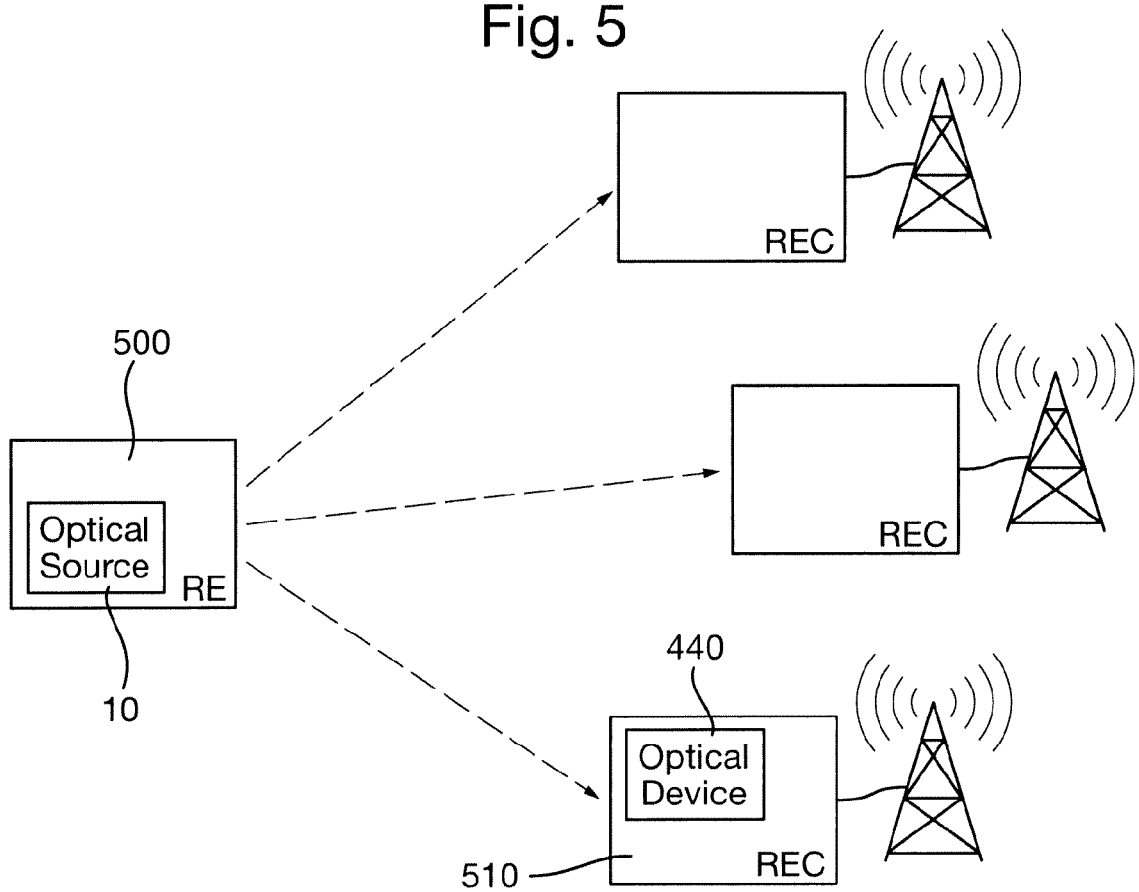
FIG. 5 shows a communications network base station including an optical source according to an embodiment of the present invention.

As seen in FIG. 5, in one embodiment, the first communications network node may be a first communications network base station node 500, for example an REC (or baseband unit) and the second communications network node may be a second communications network base station node 510, for example an RE (or remote radio unit). However, embodiments of the present invention may be applied in other applications.

Figure 6:
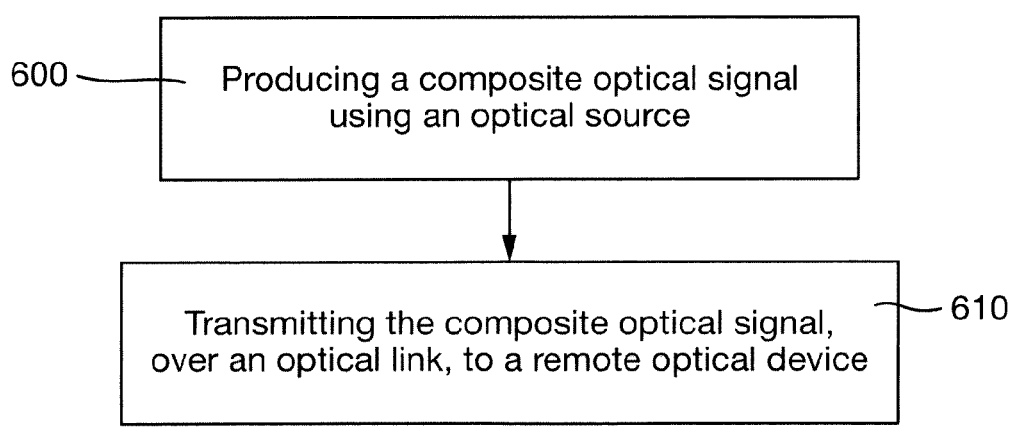
FIG. 6 is a flow diagram showing steps of a method of an embodiment of the present invention.

FIG. 6 shows a method of providing an optical signal, according to one embodiment of the present invention. The method comprises, at step 600, producing a composite optical signal using an optical source 10 according to an embodiment of the present invention; and, at step 610, transmitting the composite optical signal, over an optical link, to a remote optical device.

The invention claimed is:

1. A method of providing an output light beam having first and second components at a same fundamental wavelength and at orthogonal states of polarization, the method comprising:

forming the output light beam by, in optical path order, splitting light from a source laser into first and second light beams having the same fundamental frequency and both having a same linear polarization state, applying a controlled phase offset between the first and second light beams having a nominal phase offset value of 90 degrees plus an arbitrary multiple of 180 degrees, changing the polarization state of one of the first and second light beams so that the first and second light beams have orthogonal, first and second states of polarization, recombining the first and second light beams to form a recombined light beam, splitting the recombined light beam to form the output light beam and a first feedback light beam, the output light beam and the first feedback light beam each having a respective first component comprising a portion of the first light beam and a respective second component comprising a portion of the second light beam; and compensating the output light beam for interferometric crosstalk between the first and second light beams in the recombined light beam based on:

rotating the polarization states of the first feedback light beam by 45 degrees plus an arbitrary multiple of 90 degrees and then passing the first feedback light beam through a polarizer having first and second polarization states aligned with the first and second states of polarization, to produce a second feedback light beam comprising the sum of the first and second components of the first feedback light beam;

generating an error signal that varies in proportion to the difference between an actual phase offset between the first and second light beams at the point of recombining and the nominal phase offset value, the difference arising at least in part from random phase fluctuations in the light from the source laser, and the error signal being generated as an alternating current (AC) component of a photodetector current output from a photodetector illuminated by the second feedback light beam; and adjusting the controlled phase shift dynamically in response to the error signal, to minimize the error signal.

2. The method of claim 1, wherein the method includes coupling, via a first Polarization Maintaining Fiber (PFM), the recombined light beam from polarization-setting equipment used to form the recombined light beam to an optical splitter used to split the recombined light beam into the output light beam and the first feedback light beam, coupling, via a second PMF, the first feedback light beam to polarization-rotating equipment used to rotate the polarization states of the first feedback light beam, and coupling, via a third PMF, the first feedback light beam after rotation to the polarizer used to produce the second feedback light beam.

3. The method of claim 2, wherein the method further includes coupling the output light beam to an optical input of a downstream item of optical equipment via a Single Mode Fiber (SMF).

4. The method of claim 1, wherein imparting the controlled phase offset between the first and second light beams comprises adjusting a refractive index of one or both of first and second optical paths, the first optical path coupling the first light beam to polarization-setting equipment operative to orthogonal polarize and recombine the first and second light beams, and the second optical path coupling the second light beam to the polarization-setting equipment.

5. The method of claim 4, wherein the polarization-setting equipment is a photonic grating coupler (PGC) and each of the first and second optical paths is a silicon photonic waveguide supporting propagation of light beams having a transverse electric (TE) state of polarization, the linear polarization state of the first and second light beams being a TE state of polarization.

6. The method of claim 4, wherein adjusting the refractive index of one or both the first and second optical paths comprises jointly adjusting the refractive indexes of both the first and second optical paths.

7. The method of claim 1, wherein rotating the polarization states of the first feedback light beam by 45 degrees comprises passing the first feedback light beam through a Faraday rotator or by imposing a 45-degree offset between a polarization maintaining fiber (PMF) used to couple the first feedback light beam into the polarizer and the polarization states of the polarizer.

8. The method of claim 1, wherein adjusting the controlled phase shift dynamically in response to the error signal, to minimize the error signal, comprises adjusting the controlled phase shift to vary with respect to the nominal phase offset value of 90 degrees.

9. An apparatus configured to provide an output light beam having first and second components at a same fundamental wavelength and at orthogonal states of polarization, the apparatus comprising:

a first set of optical elements configured to form the output light beam and comprising, in optical path order:

a first optical splitter configured to split light from a source laser into first and second light beams having the same fundamental frequency and both having a same linear polarization state, phase-changing equipment configured to apply a controlled phase offset between the first and second light beams having a nominal phase offset value of 90 degrees plus an arbitrary multiple of 180 degrees, polarization-setting equipment configured to change the polarization state of one of the first and second light beams so that the first and second light beams have orthogonal, first and second states of polarization and recombine the first and second light beams to form a recombined light beam, and a second optical splitter configured to split the recombined light beam to form the output light beam and a first feedback light beam, the output light beam and the first feedback light beam each having a respective first component comprising a portion of the first light beam and a respective second component comprising a portion of the second light beam; and a second set of optical elements and corresponding electronic control circuitry configured to compensate the output light beam for interferometric crosstalk between the first and second light beams in the recombined light beam, comprising:

polarization-rotating equipment configured to rotate the polarization states of the first feedback light beam by 45 degrees plus an arbitrary multiple of 90 degrees, a polarizer subsequent to the phase-rotating equipment and having first and second polarization states aligned with the first and second states of polarization, and configured to produce a second feedback light beam comprising the sum of the first and second components of the first feedback light beam;

a photodetector circuit that is configured to generate an error signal that varies in proportion to the difference between an actual phase offset between the first and second light beams at the point of recombining and the nominal phase offset value, the difference arising at least in part from random phase fluctuations in the light from the source laser, and the error signal being generated as an alternating current (AC) component of a photodetector current output from a photodetector illuminated by the second feedback light beam; and a control circuit configured to adjust the controlled phase shift dynamically in response to the error signal, to minimize the error signal.

10. The apparatus of claim 9, wherein the apparatus includes a first Polarization Maintaining Fiber (PFM) coupling the recombined light beam from the polarization-changing equipment to the second optical splitter, a second PMF coupling the first feedback light beam to the polarization-rotating equipment, and a third PMF coupling the first feedback light beam after rotation to the polarizer used to produce the second feedback light beam.

11. The apparatus of claim 10, further comprising a Single Mode Fiber (SMF) coupling the output light beam to an optical input of a downstream item of optical equipment.

12. The apparatus of claim 9, wherein the phase-changing equipment comprises first and second optical paths respectively coupling the first and second light beams to the polarization-setting equipment, and wherein one or both the first and second optical paths has an adjustable refractive index for imparting the controlled phase offset between the first and second light beams.

13. The apparatus of claim 12, wherein the polarization-setting equipment is a photonic grating coupler (PGC) and each of the first and second optical paths is a silicon photonic waveguide supporting propagation of light beams having a transverse electric (TE) state of polarization, the linear polarization state of the first and second light beams being a TE state of polarization.

14. The apparatus of claim 13, wherein each of the first and second optical paths has an adjustable refractive index.

15. The apparatus of claim 9, wherein the polarization-rotating equipment comprises a Faraday rotator or comprises an optical path arrangement having a 45-degree offset between a polarization maintaining fiber (PMF) used to couple the first feedback light beam into the polarizer and the polarization states of the polarizer.

* * * * *